United States Patent Office 3,183,215
Patented May 11, 1965

3,183,215
CROSS-LINKED POLY(ESTER-ACETALS)
Everett H. Pryde, Peoria, Ill., assignor to the United States of America as represented by the Secretary of Agriculture
No Drawing. Filed Apr. 16, 1962, Ser. No. 187,994
5 Claims. (Cl. 260—75)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This is a continuation-in-part of my application S.N. 72,532, filed November 29, 1960, now abandoned, to the extent that it also incorporates the preparation of a starting material disclosed in my copending application S.N. 103,175, filed April 14, 1961 and entitled "Poly- and Interpoly(Amide-Acetals).

This invention relates to my discovery that certain novel soluble poly(ester-acetal) polymers can be readily cured in an unobvious and commercially advantageous manner to form insoluble cross-linked products which have remarkable affinities for glass surfaces and which, therefore, have utility as bonding agents for glass laminates. Also, the partially cured polymers can be drawn out into fairly elastic fibers, and the presence of reactive sites in the uncured form should facilitate the application of dyes prior to curing.

Unsaturated polyesters are ordinarily cross-linked by adding a copolymerizable monomer such as styrene in the thermosetting stage. It is also well known that both saturated and unsaturated polyesters may be cross-linked under free-radical oxidative conditions. However, I have now discovered that certain novel soluble poly(ester-acetal) resins initially formed under alkaline conditions, under which the acetal groups appear to be inactive, may be cross-linked by the addition of a non-oxidative catalyst in the thermosetting step, thus activating the acetal groups and forming insoluble, infusible transparent gels having so marked an adhesion to the glass of the reaction flask that it is likely that the acetal groups thereof are in molecular combination with the glass surface.

The principal object of this invention is the preparation of certain novel poly(ester-acetal) resins. Another object is a commercially advantageous non-oxidative catalytic method of cross-linking the novel linear poly(ester-acetal) resins so as to readily form novel insoluble, infusible, transparent gels having an extraordinary affinity for glass. Other objects will become apparent to one skilled in the art.

Clements et al., Jour. Org. Chem. 24, 1958 (1959), teach the preparation of the 3,9-dicarboxyalkyl acids of 2,4,8,10-tetraspiro[5,5]undecane, one member of which homologous series of dibasic acids may be called the pentaerythritol acetal of azelaic semialdehyde or more specifically 3,9 - bis(7 - carboxyheptyl) - 2,4,8,10 - tetraoxaspiro[5,5]undecane having the formula:

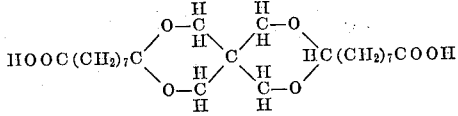

Capps, U.S. Patent 2,889,290, shows the preparation of linear polycyclospiroacetals.

In the investigations resulting in the discoveries of the instant invention I prepared the pentaerythritol acetal of methyl azelaaldehyde, namely 3,9-bis(7-carbomethoxy-heptyl)-2,4,8,10-tetraoxaspiro[5,5]undecane by reacting pentaerythritol with methyl azelaaldehydate, the latter being obtained from the ozonolysis of methyl oleate (Pryde et al., J. Org. Chem. 25, 618 (1960); also by saponifying the above dimethyl ester, I obtained substantially quantitative yields of the said dibasic acid, i.e., the pentaerythritol acetal of azelaic semialdehyde.

Condensation of pentaerythritol acetal of azelaic semialdehyde with ethylene glycol in the absence of any catalyst resulted in a cross-linked rubbery gel which swelled but did not dissolve in benzene or a 50 percent solution of phenol in tetrachloroethane. Apparently acidity of the free carboxyl groups was sufficient to activate the acetal groups.

Condensation of the pentaerythritol acetal of methyl azelaaldehydrate, with ethylene glycol using lime as a catalyst gave a linear poly(ester-acetal) polymer which was soluble in benzene and in a 50 percent solution of phenol in tetrachloroethane. The polymer had a molecular weight of 5700 and a melting range of 78–81° C.

I discovered that such soluble poly(ester-acetal) polymers formed first under alkaline conditions may be cross-linked by heating after adding a non-oxidative catalyst such as zinc oxide, lead oxide, or p-toluene sulfonic acid. For example, soluble linear poly(ethylene terephthalates) containing preferably 10–30 mole percent (based on the total dibasic acid present) of the pentaerythritol acetal of methyl azelaaldehydate were cross-linked by heating with a catalyst such as zinc oxide, zinc acetate, lead oxide, or p-toluenesulfonic acid.

Cross-linked poly(ester-acetal) polymers containing 10 mole percent of the said pentaerythritol acetal of methyl azelaaldehydate were hard, brittle, translucent, light colored solids. Similar polymers containing 20 mole percent of the said pentaerythritol acetal were tough, transparent somewhat flexible resins. Those containing 30 mole percent of the acetal were tough, tan, transparent rubbery gels. The preferred cross-linked resins, containing either 20 or 30 percent of the acetal, showed such adhesion to the flask that they could not be separated therefrom even by chilling the flask and adhering polymer to −60° C.

Heat alone (in the absence of a catalyst) apparently finally caused a minor degree of cross-linking, as evidenced by limited increases in the viscosities of the soluble poly(ester-acetals), but this occurred only after very long commercially-impracticable periods at the tempratures (250°–270° C.) used for the condensation, and the uncatalyzed products were entirely different than those of the invention, being opaque, non-adhesive to glass, and soluble in a tetrachloroethane solution of phenol.

The following non-limiting examples are intended to more fully illustrate my invention.

EXAMPLE 1

The pentaerythritol acetal of methyl azelaaldehydate, i.e., 3,9-bis(7-carbomethoxyheptyl)-2,4,8,10-tetraoxaspiro [5,5]undecane was prepared by placing 100.7 g. (0.348 mole) of methyl azelaaldehydate dimethyl acetal of 80.2 percent purity, 29.3 g. (0.215 mole) of pentaerythritol, and 0.1 g. of potassium acid sulfate in a 3-necked, 500 ml., round-bottomed flask fitted with a thermometer, a capillary tube for nitrogen, and a 4-in. Vigreux column and distilling head. The flask and contents were heated at a pot temperature of 127°–134° C. for 5 hours, during which period 19.0 g. of methanol distilled off and was collected. Toluene (100 ml.) was added, and heating was continued for 3 hours with slow distillation of the toluene until the pot temperature reached 142° C. and the vapor temperature was 105° C. After cooling, the solidified reaction mass was dissolved in 150 ml. methylene chloride. The solution was filtered to remove unreacted pentaerythritol (4.33 g.) and washed with water. After removal of solvent, the product was distilled at reduced pressure to give 75.4 g. of material boiling at 241°–260° C. at 0.35 mm. pressure. Recrystallization from absolute ethanol gave 69.9 g. (85 percent of theory) of crystals melting at 65°–67° C.

*Analysis.*—Calcd. for $C_{25}H_{44}O_8$: C, 63.53; H, 9.38; sapon. equiv. 236.3. Found. C, 63.54; H, 9.23; sapon. equiv. 236.7.

EXAMPLE 2

Into a 250 ml. distilling flask equipped with a thermometer and a capillary inlet for nitrogen, were placed 62.1 g. (0.32 mole) of dimethyl terephthalate, 37.8 g. (0.08 mole) of pure 3,9-bis(7-carbomethoxyheptyl) - 2,4,8,10-tetraoxaspiro[5,5]undecane having a melting point of 66–67° C., 0.48 mole (20 percent excess) of ethylene glycol, and 0.01 g. calcium oxide. The flask was heated gradually, and at 190° C. methanol began distilling. Heating was continued at 240–260° C. for about 7½ hours at atmospheric pressure, then for 1 hour at 200 mm. Hg, and finally for 3 hours at 0.15 mm. Hg, and 260° C., the reaction mixture being agitated throughout the heating period by nitrogen flowing from the capillary. The resulting polymer was an opaque, white solid which melted at 174–182° C.

Fifteen g. of the above polymer was introduced into each of four 50 ml. distilling flasks equipped with a capillary inlet for nitrogen and a 1 ml. graduated pipette from which the tip had been removed so as to permit relative melt-viscosity determinations by measuring the time required for flow between two 0.1 ml. marks. No catalyst was added to the control flask, but 0.006 g. of lime was added to the second flask, 0.01 g. of boric acid to the third, and 0.005 g. of lead oxide to the fourth flask. The flasks were heated under vacuum at 260° C. in a silicone oil bath, and the relative viscosities determined periodically. The initial melt viscosity was 1.0 second. After 103 min. the lead oxide-catalyzed polymer formed a gel whereas that with boric acid gelled in 401 minutes, that with lime in 428 minutes, and that without a catalyst solidified somewhat in 431 minutes without becoming transparent or adherent to glass.

EXAMPLE 3

Another gelation experiment was conducted comparing unmodified poly(ethylene terephthalates) and a modified polyester copolymer (prepared by condensing a mixture of dibasic esters composed of 30 mole percent of the pentaerythritol acetal of methyl azelaaldehydate and 70 mole percent of dimethyl terephthalate) with ethylene glycol. Whereas the modified polyester copolymer gelled 40 minutes after the addition of litharge, the unmodified poly(ethylene terephthalate) continued uniformly to increase its viscosity with no tendency to gel even after a total heating time of 27 hours. Parallel gelation experiments following the addition of boric acid gave the following results: after 278 minutes of heating the modified polyester solidified whereas the unmodified poly(ethylene)terephthalate showed no increase in viscosity.

EXAMPLE 4

*Interpolymers with dimethyl terephthalate cross-linking with various catalysts*

Dimethyl terephthalate (97.6 g., 0.4 mole), pentaerythritol acetal of methyl azelaaldehydate (47.2 g., 0.1 mole), ethylene glycol (85.4 g., 1.38 moles), and sodium carbonate (0.02 g.) were placed in a modified 250 ml. distilling flask equipped with a thermometer and a capillary inlet for nitrogen. (The large excess (175%) of ethylene glycol was inadvertent, but distilled off during the reaction and had no effect on the final product.) The mixture was heated for 5 hours at 170–196° C., 6 hours at 200–223° C., then for 1½ hours while the temperature was gradually increased to 305° C. to remove excess ethylene glycol. Heating was continued under reduced pressure for 2½ hours at 221–244° C. and 24 mm. and for 4½ hours at 244–267° C. at 0.15 mm. of mercury. The melt viscosity at this point was 2.5 sec. The product had a melting point of 188–194° C., and a limiting viscosity number of 6.7.

To 10 g. of the above polymer in a modified 25 ml. distilling flask was added 0.05–0.10 percent of respective catalyst and the polymer was heated at 270° C. The results shown in Table I were obtained.

TABLE I

| Concentration of catalyst | Melt viscosity | | Gell time (min.) |
|---|---|---|---|
| | (Sec.) | T./min. | |
| 0.05% PbO | 17 | 11 | 26 |
| 0.05% Zn (OAc)₂ | 8.4 | 4 | 26 |
| | 16 | 16 | 32 |
| 0.05% Sb₂O₃ | 4.2 | 8 | |
| 0.10% p-toluenesulfonic acid | 8.0 | 11 | 39 |
| | 46.8 | 30 | 62 |
| 0.05% ZnO | 5.0 | 13 | |
| | 8.2 | 30 | 76 |
| | 23 | 51 | |
| 0.05% Boric acid | 5.4 | 11 | |
| | 6.0 | 21 | 72 |
| | 15.4 | 37 | |
| 0.1% Magnesium acetate hydrate | 5.0 | 9 | |
| | 6.0 | 20 | 87 |
| | 12 | 35 | |
| | 40 | 57 | |
| 0.05% p-toluenesulfonic acid | 4.8 | 6 | |
| | 4.6 | 18 | 135 |
| | 19.0 | 73 | |
| 0.05% Sodium carbonate | 3.8 | 14 | 183 |
| | 13.8 | 65 | |

The products obtained with 0.05 percent lead oxide, 0.05 percent zinc acetate, 0.05 percent antimony trioxide, and 0.1 percent p-toluenesulfonic acid were insoluble, infusible transparent solids. They were so strongly bonded to the glass of the reaction vessel that shattering the glass vessel caused glass to shear off in flakes or powder without separation of the glass-resin bond.

EXAMPLE 5

*Interpolymer with dimethyl azelate*

Dimethyl azelate (8.65 g., 0.04 mole), pentaerythritol acetal of methyl azelaaldehydate (4.72 g., 0.01 mole) hexamethylene glycol (7.09 g., 0.06 mole) and lime (0.005 g.) were placed in a modified 50 ml. distilling flask and heated with nitrogen agitation for 8 hours at 248–276° C. at atmospheric pressure, then for 5 hours at 247–265° C. and 0.75 mm. of mercury. The melt viscosity at the end of this time was 1.6 seconds (1.7 poises). The cooled product was a soft, waxy, white solid with a melting point of 41.5–44° C.

Four grams of the thusly obtained polymer was placed in each of two modified 25 ml. distilling flasks equipped with a pipette-viscometer and a capillary inlet for nitrogen. To one was added 0.005 g. of lead oxide and to the other, 0.005 g. of lime. After about 170 minutes at 265° C., the sample containing the lead oxide had solidified. This was a translucent gray solid, strongly adherent to the glass of the reaction flask, and which melted with decomposition only at the ignition temperature. It swelled but did not dissolve in a 50 percent solution of phenol in tetrachloroethane. It was flexible and could be cold drawn to a tough, transparent film. The sample containing the lime catalyst had increased in melt viscosity to 2.4 poises after the same heating period. This polymer melted at 42–44° C. and dissolved in a 50 percent solution of phenol in tetrachloroethane.

Having disclosed my invention, I claim:

1. Cross-linked, infusible, transparent poly(ester-acetal) gels that are extremely adherent to glass, said gels being the product obtained by distilling methanol from the reaction produced by heating a mixture consitsing of 10–30 mole percent of 3,9-bis(7-carbomethoxyheptyl)-2,4,8,10-tetraoxaspiro[5,5]undecane, 90–70 mole percent of dimethyl terephthalate, at least one mole equivalent of ethylene glycol, and a catalytic amount of calcium oxide.

for about 10 hours at about 260–275° C., initially at atmospheric pressure and then at progressively lowered pressures, to form a linear poly(ester-acetal), adding a catalytic amount of a crosslinking catalyst selected from the group consisting of lead oxide, antimony trioxide, and zinc acetate and heating at about 260° C. until crosslinking as evidenced by gel formation occurs.

2. The method of curing the linear poly(ester-acetal) polymer of claim 1 to produce a glass-adhering, infusible, crosslinked gel comprising the method of adding to said linear polymer a catalytic amount of a non-oxidizing catalyst selected from the group consisting of lead oxide, antimony trioxide, and zinc acetate and heating the mixture at about 260° C. until crosslinking as evidenced by gel formation occurs.

3. The method of claim 2 wherein the non-oxidizing catalyst is lead oxide.

4. The method of claim 2 wherein the non-oxidizing catalyst is antimony oxide.

5. The method of curing the linear poly(ester-acetal) formed by reacting a mixture consisting of 10–30 mole percent of 3,9-bis(7-carbomethoxyheptyl)-2,4,8,10-tetraoxaspiro[5,5]undecane, 90–70 mole percent of dimethyl terephthalate, and at least one mole equivalent of ethylene glycol in the presence of a catalytic amount of calcium oxide for about 10 hours at about 260–275° C., said method comprising the steps of adding to said linear poly(ester-acetal) a catalytic amount of zinc acetate and heating at about 260° C. until crosslinking as evidenced by gel formation occurs.

References Cited by the Examiner
UNITED STATES PATENTS 2,641,592 6/53 Hofrichter _____ 260—75
3,092,597 6/63 Leech et al. _____ 260—75

OTHER REFERENCES

Pryde et al.: Article pp. 2260–2261, Journal of Organic Chemistry, volume 25, No. 12 (December 1960).

WILLIAM H. SHORT, *Primary Examiner.*
LOUISE P. QUAST, *Examiner.*